United States Patent Office 3,018,166
Patented Jan. 23, 1962

3,018,166
METHOD FOR THE REGENERATION OF WASTE SOLUTIONS OF SULFURIC ACID
William Ward Powell, Jr., R.F.D. 1, Clinton, Pa.
No Drawing. Filed Mar. 8, 1960, Ser. No. 13,441
11 Claims. (Cl. 23—126)

This invention relates to a novel method for the regeneration of waste solutions of sulfuric acid which contain ferrous sulfate, and for the recovery of ferrous sulfate therefrom. More particularly, the invention concerns the regeneration of spent iron and steel pickle liquor by a method of dehydration utilizing mechanical compression of water vapor removed from the liquor, and supplying heat to the evaporating liquor by condensation of the compressed water vapor.

In the processing of fabricated forms of iron and steel, such as sheets, strip, and the like, a pickling step is employed to remove mill scale, or iron oxide, from the metal surface. There is conventionally employed for this purpose a relatively dilute solution of sulfuric acid having a concentration of about 20% $H_2SO_4$. In the course of the pickling operation, iron oxide is dissolved by the sulfuric acid with formation of ferrous sulfate, and the concentration of the latter finally reaches a point where the pickle liquor ceases to function efficiently and must be discarded or regenerated. Such spent pickling liquor, depending upon mill products and practices, ordinarily contains from about 3 to 20 percent by weight of sulfuric acid and from about 14 to 20 percent of ferrous sulfate as $FeSO_4$, the balance being other metal salts, such as manganese sulfate, and water.

The disposal of spent pickle liquor has long presented a practical problem to mill operators, since it involves either stream or soil pollution or regeneration and recovery processes which have thus far proved generally uneconomical, even where recovery of the ferrous sulfate content is possible.

It is known that in the presence of sulfuric acid, the solubility of ferrous sulfate varies in accordance with the concentration of $H_2SO_4$, diminishing as the concentration of $H_2SO_4$ increases. Graphical data illustrating this behavior of $FeSO_4$ are to be found, for example, in Chemical Engineering, volume 64, August 1957, at page 168. These data indicate that at a temperature of 120° F., and in the presence of various concentrations of $H_2SO_4$, the maximum residual concentrations of $FeSO_4$ in an aqueous sulfuric acid solution would be of the order of magnitude shown in the following table:

TABLE 1

| Percent $H_2SO_4$ | Percent $FeSO_4$ |
|---|---|
| 30 | 10 |
| 35 | 7 |
| 40 | 4 |
| 45 | 3 |
| 60 | 0.5 |
| 75 | trace |

Efforts have been made to take advantage of this known solubility behavior of ferrous sulfate in previously suggested methods for regeneration of sulfuric acid liquor and recovery of its ferrous sulfate content. These prior art proposals have generally taken the approach of either fortifying the liquor with additions of sulfuric acid to achieve $H_2SO_4$ concentrations which would diminish the solubility of ferrous sulfate, or of heating the liquor to accomplish removal of water until the sulfuric acid content reaches a desired level. The mass of ferrous sulfate crystals, usually in the form of a monohydrate, thereby precipitated, was removed from the concentrating apparatus and recovered. The known methods of spent pickle liquor treatment have not been widely adopted, mainly because they are uneconomical and because in most cases they yield ferrous sulfate in a physical form in which it is difficultly separable, owing to the presence of a large proportion of fine particles.

For the reconcentration of the sulfuric acid liquor, methods are known in which a vacuum evaporator of conventional design is employed, the spent acid being heated by an external medium, such as steam, supplied to the evaporator tubes or coils. Thus, one known method concentrates spent liquor at 130° F. in a vacuum evaporator heated by steam to a sulfuric acid strength which is insufficient to cause precipitation of much ferrous sulfate, then removes the liquor and fortifies it in a separate vessel with oleum to a concentration of 60% $H_2SO_4$ to precipitate the bulk of the ferrous sulfate. Another method concentrates spent liquor at a temperature of about 190° F. in an externally heated vacuum evaporator under vacuum until an acid concentration of about 55% to 60% is attained, thus obtaining a slurry of ferrous sulfate monohydrate, which is withdrawn and separated by settling. Both of these methods involve an unsatisfactory heat economy in that they rely on external fuel supply, and both are not readily adaptable to continuous liquor regeneration and recovery.

In accordance with the present invention, there is provided a novel continuous method for the regeneration of spent pickle liquor and recovery of ferrous sulfate therefrom which possesses an extremely favorable heat economy, requiring no outside source of heat or fuel, and which utilizes the discovery that there is a critical concentration of sulfuric acid at which optimum separation of ferrous sulfate monohydrate crystals from the liquor is obtained. The novel method of this invention makes possible the utilization of a compact and economical liquor treatment unit which may be installed adjacent to the pickling system.

In accordance with a preferred embodiment of my novel method, spent pickle liquor leaving the pickling system normally at a temperature of about 180° F. or higher is cooled to a temperature of about 120° F., by any suitable means, such as for example, a heat exchanger. The heat exchanger may be of any suitable type, such as a shell and tube exchanger, and may be made of corrosion resistant material, such as stainless steel. The cooling or heat exchange medium in this heat exchanger is primarily condensed water vapor supplied from the vacuum evaporator unit referred to below, entering the heat exchanger at a temperature of about 120° F., and leaving at about 180° F. There is also circulated as a cooling medium through a portion of the tubes the supernatant spent pickle liquor which has been separated from its ferrous sulfate content, as described below, also at a temperature of about 120° F. An auxiliary supply of cooling water to the heat exchanger may be employed for more complete temperature control. The heated spent liquor high in acid is thence returned to the pickling system and reused. The water can be returned either to the pickling system to be used as rinse water and/or to diminish the strength of the regenerated pickle liquor, or else discarded.

The pickle liquor at a temperature of about 120° F. is then dehydrated in a vacuum type evaporator which is operated under a vacuum sufficient to maintain a liquor boiling temperature of about 120° F. The method of dehydration employed involves mechanical compression of water vapor removed under vacuum from the boiling pickle liquor to achieve a temperature difference between the compressed water vapor and the liquor temperature of about 10° F. which temperature difference thus becomes available for heat transfer in the heating coils or tubes of the evaporator. Thus, the mechanical compression of the water vapor removed from the liquor enables the latent heat of vaporization to be continually reused to transfer its heat from the condensing section of the evaporator back to the boiling section of the evaporator. This provides a heat economy equivalent to that of a multiple effect evaporator, but with no expenditure of energy for external heat or fuel supply. The sole energy necessary to be supplied is that of the means used to drive the compressor. The latter is preferably of the hydrodynamic type, preferably a centrifugal compressor.

The energy balance of the evaporating system of this invention, employing a temperature difference of approximately 10° F. between the temperature of the compressed and the condensing water vapor is represented by the difference in energy between that released by the condensing water vapor and that required for evaporation of the liquor in the evaporator. Thus, compressed water vapor at 130° F. is supplied to the closing heating (condensing) coils of the evaporator, releasing latent heat of condensation equal to about 1018 B.t.u. per pound. The evaporator is maintained continuously at low pressure, enabling incoming feed to be continuously drawn in by suction. The feed liquor falls from the inlet pipe to form a pool of liquor in which the heating tubes of the evaporator are submerged. The latent heat of condensation of the compressed water vapor supplies the latent heat of vaporization of the liquor which is on the other side of the heating (condensing) coils. This liquor, being under vacuum, remains at 120° F., at which temperature the latent heat of vaporization required to remove water therefrom as vapor, is about 1024 B.t.u. per pound. Thus, there need be supplied to the evaporator only the work required to compress water vapor from 120° F. to 130° F., or about 18 B.t.u., plus additional energy sufficient to overcome frictional losses. This energy is obtained from the motor or turbine driving the compressor. No energy is supplied by direct heating utilizing fuel. The degree of vacuum required to maintain the liquor in the evaporator at 120° F. will be of the order of 3.4 inches of mercury, or about 1.7 pounds per sq. in. absolute pressure.

While in the foregoing preferred embodiment it has been indicated that the temperature of the spent liquor feed going into the evaporator is preferably about 120° F., it is to be understood that considerable latitude in feed liquor temperature is permissible, the principle being that of introducing the feed liquor into the evaporator at a temperature approximately the same as that temperature at which the liquor is maintained during its dehydration in the evaporator. Within the evaporator the liquor temperature may be maintained between fairly wide limits, ranging, for example, from about 20° F. to 210° F. or even higher. Ordinarily it is impractical to employ too low a temperature owing to the high vacuum required, involving the handling of excessive volumes of water vapor. The degree of vacuum corresponding to the foregoing temperature range would be approximately between 0.08 and 14.1 pounds per square inch absolute pressure.

A suitable type of vacuum evaporator for carrying out the method of this invention is one which comprises a vaporizing chamber having in its upper portion an inlet pipe (nozzle) for introduction of liquor feed by internal suction, and at its lower end a discharge means for removal of regenerated acid liquor and ferrous sulfate crystals. Disposed in the lower portion of the chamber is a bank of heat exchange tubes or coils around which the descending liquir collects, forming a pool in which the tubes are submerged. Water vapor from the liquor is drawn through an outlet pipe to a compressor, where it is compressed to a pressure sufficiently high to provide an approximately 10° F. temperature difference between the boiling liquor and the condensing water vapor in the evaporator coils. The volume of liquor feed entering the evaporator is regulated so that it corresponds to the volume of regenerated acid liquor, crystals, and water removed from the evaporator, while at the same time, the concentration of sulfuric acid in the pool of boiling liquor is maintained substantially constant. The discharge means for the acid-crystal slurry which forms, comprises a pipe connected to a pump which discharges at atmospheric pressure into a separating device or tank.

In accordance with another aspect of the invention, it has been unexpectedly found that dehydration of the spent pickle liquor to a sulfuric acid concentration between about 35% and about 45%, and preferably about 40%, results in a separation of ferrous sulfate monohydrate under optimum conditions of heat consumption efficiency, and in the most favorable crystal form and particle size. Liquor of this acid concentration forms the pool of liquor in the evaporator and normally contains from about 3 to 5 percent by weight of dissolved ferrous sulfate. Excess ferrous sulfate is continuously precipitated therefrom and removed as slurry with excess liquor. Any manganese present is also recovered in admixture with the ferrous sulfate, probably also in the form of manganese sulfate monohydrate.

The critical character of the range of sulfuric acid concentration of 35% to 45% in relation to the residual concentration of ferrous sulfate contained in the liquor, and to the energy required for most efficient removal of a given quantity of ferrous sulfate, is indicated in Table 2.

TABLE 2

*Residual ferrous sulfate concentration and adjusted heat energy requirement*

| (1) Percent by Wt. $H_2SO_4$ | (2) Percent by Wt. $FeSO_4$ | (3) Tons $H_2O$ Vaporized | (4) Tons $FeSO_4$ | (5) Tons $FeSO_4 \cdot H_2O$ Crystals | (6) $FeSO_4$ Removal Efficiency, percent | (7) $H_2O$ Heat of Vaporization, B.t.u. $\times 10^6$ | (8) Heat of Crystalization B.t.u. $\times 10^6$ | (9) Net Total Heat Consumed, B.t.u. $\times 10^6$ | (10) Net Total Heat Consumed ÷ Efficiency, B.t.u. $\times 10^6$ |
|---|---|---|---|---|---|---|---|---|---|
| 20 | 17  | 79.3  | 18.5 | 20.7 | 68.5 | 158.6 | 5.8 | 152.8 | 223 |
| 30 | 10  | 90.2  | 23.7 | 26.5 | 87.5 | 180.4 | 7.4 | 173.0 | 198 |
| 35 | 7   | 92.1  | 24.9 | 27.9 | 92.2 | 184.2 | 7.8 | 177.4 | 193 |
| 40 | 4   | 95.9  | 26.0 | 29.1 | 96.0 | 191.8 | 8.2 | 183.6 | 191 |
| 45 | 3   | 97.2  | 26.3 | 29.4 | 97.4 | 194.4 | 8.3 | 186.1 | 191 |
| 50 | 2   | 100.2 | 26.6 | 29.8 | 98.5 | 200.4 | 8.4 | 192.0 | 195 |
| 60 | 0.5 | 102.6 | 26.8 | 30.0 | 99.5 | 205.2 | 8.4 | 196.8 | 198 |

Table 2 illustrates data resulting from the treatment of a quantity of 150 tons of spent pickle liquor having an initial composition of 7% $H_2SO_4$ and 18% $FeSO_4$ by weight, balance water, in accordance with the method of this invention. Starting with spent pickle liquor and dehydrating under vacuum at a temperature of 120° F. to the respective acid and corresponding residual ferrous sulfate contents shown in columns (1) and (2), respectively, the corresponding quantities of water which must be vaporized are shown in column (3), and of the amounts of ferrous sulfate removed as FeSO₄ in column (4), and as monohydrate in column (5). The efficiency of removal of the ferrous sulfate (as $FeSO_4$) is given in column (6). Column (7) represents the amounts of energy transferred (latent heat of vaporization) to the boiling liquor. Column (8) represents the energy released by the hydration of the ferrous sulfate to the monohydrate. Column (9) is the net energy consumed, representing the difference between columns (7) and (8).

The significant character of the critical acid concentration range which is to be maintained in the boiling liquor in accordance with the method of this invention is apparent from the data in column (10), wherein the figures are the ratio of the net energy consumed (column (9)) to the efficiency of removal of FeSO₄ (column (5)), expressed in B.t.u. Thus, column (10) represents an adjusted energy requirement for the removal of a given quantity of ferrous sulfate. It will be seen from column (10) that the adjusted energy requirement is lowest (191 to 193 B.t.u.) when the concentration of sulfuric acid in the boiling liquor lies between 35% and 45%. At the lower end of the scale, for example where the acid concentration is 20% and the efficiency of removal of FeSO₄ is 68.5%, more overall heat energy must be supplied to the system (223 B.t.u.) even though at this level column (9) indicates the least apparent heat consumption, because of the low efficiency of removal of FeSO₄. At the higher levels of acid concentration, the amount of water to be vaporized increases at a greater rate than the rate at which the efficiency of FeSO₄ removal is increasing, so that a point of diminishing returns is reached, reflected by the rising ratio in column (10). Accordingly, the optimum ratios corresponding to the acid concentration range of 35% to 45% permit the design of equipment with optimum size and efficiency where this acid concentration range is employed.

Although the novel method of this invention has been illustrated with respect to the regeneration of spent pickle liquor and the recovery of ferrous sulfate therefrom, it is to be understood that the method is applicable to the treatment of other types of waste solutions of sulfuric acid which contain ferrous sulfate and other dissolved metal salts, such as, for example, waste solutions obtained in the production of titanium dioxide by treatment of ilmenite ores with sulfuric acid.

The following example illustrates the invention, but it is not to be regarded as limited thereby:

EXAMPLE

A spent pickle liquor having the following composition:

$H_2SO_4$ _____ 7% by weight.
$FeSO_4$ _____ 18% by weight.
Water _____ Balance.
Sp. gr. at 70° F. _____ 1.229.

is adjusted to a temperature of 120° F. and continuously fed into a vacuum evaporator through an inlet pipe located in the upper portion of the vacuum chamber of the avaporator. The liquor falls into a boiling pool of liquor in which a bank of heating tubes is submerged. The evaporator is maintained under a vacuum of 3.4 inches of mercury. The temperature of the liquor at the coil surfaces is 120° F. Water vapor is withdrawn by vacuum from the liquor surface and removed through an exit pipe at the upper end of the vacuum chamber. The water vapor, at 120° F., is drawn into the suction end of a compressor and compressed to a pressure corresponding to a condensing temperature of 130° F. The compressed water vapor is continuously supplied to the tube bank of the evaporator, condensing therein to yield up its latent heat of condensation, thereby evaporating water from the liquor. After starting up, the dehydration of the liquor progresses until a point is reached at which the liquor forms a pool in which the $H_2SO_4$ concentration remains substantially constant at about 40%. When the sulfuric acid concentration reaches 40%, the concentration of FeSO₄ is about 4% by weight, the excess of the FeSO₄ crystallizing continuously as the monohydrate, forming a slurry, which is allowed to flow into a settling tank. The acid supernatant liquor is separated from the crystals of FeSO₄.H₂O, and pumped back to the pickling system through a counterflow heat exchanger, thereby raising its temperature to approximately 180° F. or substantially to the temperature of the pickling vats. The ferrous sulfate recovery is about 96%.

I claim:

1. Method for the regeneration of a waste solution of sulfuric acid which comprises evaporating a body of the acid solution at its boiling point at subatmospheric pressure, separating water vapor from said acid solution, withdrawing said separated water vapor to achieve said subatmospheric pressure and compressing said separated water vapor to achieve a temperature difference between said compressed water vapor and said boiling acid solution of about 10° F. above the temperature of said acid solution, supplying heat to said acid solution by condensation of said compressed water in indirect heat exchange with said body of acid solution, and continuing to evaporate said acid solution while maintaining said acid solution at a concentration between about 35% and about 45% $H_2SO_4$ by weight.

2. The method of claim 1 in which the temperature of the boiling body of solution is between about 20° F. and about 210° F.

3. Method for the regeneration of a waste solution of sulfuric acid containing ferrous sulfate and recovery of ferrous sulfate therefrom, which comprises evaporating a body of said acid solution at its boiling point at subatmospheric pressure, separating water vapor from said acid solution, withdrawing said separated water vapor to achieve said subatmospheric pressure and compressing said separated water vapor to achieve a temperature difference between said compressed water vapor and said boiling acid solution of about 10° F. above the temperature of said acid solution, supplying heat to said acid solution by condensation of said compressed water vapor in indirect heat exchange with said body of acid solution, continuing to evaporate said acid solution while maintaining said acid solution at a concentration between about 35% and about 45% $H_2SO_4$ by weight, and recovering ferrous sulfate insoluble in said acid solution in the form of ferrous sulfate monohydrate.

4. Method for the continuous regeneration of spent pickle liquor containing sulfuric acid and ferrous sulfate, and recovery of ferrous sulfate therefrom, which comprises adjusting the temperature of said pickle liquor to about 120° F., continuously introducing said pickle liquor into a body of said pickle liquor boiling at subatmospheric pressure at a temperature of about 120° F. to evaporate water therefrom, separating water vapor from said boiling liquor, withdrawing said separated water vapor from said liquor to achieve said subatmospheric pressure and compressing said separated water vapor to achieve a temperature difference between said compressed water vapor and said boiling liquor of about 10° F. above the temperature of said boiling liquor, supplying heat to said boiling liquor by condensation of said compressed water vapor in indirect heat exchange with said body of liquor, continuing to evaporate said boiling liquor while maintaining the acid concentration thereof between about 35% and about 45% $H_2SO_4$ by weight, and continuously withdrawing ferrous sulfate insoluble therein and excess liquor from said body of liquor.

5. Method for the continuous regeneration of a supply of a waste solution of sulfuric acid which comprises maintaining a body of said acid solution at its boiling point at subatmospheric pressure and at a higher acid concentration than the supply of waste solution, adjusting the temperature of the supply of waste solution to approximately the temperature of said body of said acid solution, continuously introducing said supply of waste solution into said body of boiling acid solution, separating water vapor from said body, withdrawing said water vapor to achieve said subatmospheric pressure and compressing said separated water vapor to achieve a temperature difference between said compressed water vapor and said boiling body of about 10° F. above the temperature of said boiling body, supplying heat to said boiling body by condensation of said compressed water vapor in indirect heat exchange with said boiling body, and continuously withdrawing from said boiling body regenerated sulfuric acid solution in excess of that required to maintain said boiling body at substantially constant volume.

6. The method of claim 5, in which the concentration of the boiling body of solution is between about 35% and about 45% $H_2SO_4$ by weight.

7. The method of claim 5, in which the temperature of the boiling body of solution is about 120° C.

8. The method of claim 5, in which the temperature of the supply of waste solution is adjusted by heat exchange with the excess regenerated sulfuric acid solution.

9. Method for the continuous regeneration of spent pickle liquor containing sulfuric acid and ferrous sulfate, and recovery of ferrous sulfate therefrom, which comprises maintaining a body of said pickle liquor having a concentration of between about 35% and about 45% by weight $H_2SO_4$ at its boiling point at subatmospheric pressure, adjusting the temperature of a supply of spent pickle liquor to approximately the temperature of said boiling body of liquor, continuously introducing said supply of spent liquor into said boiling body of liquor, separating water vapor from said body, withdrawing said water vapor to achieve said subatmospheric pressure and compressing said separated water vapor to achieve a temperature difference between said compressed water vapor and said boiling body of about 10° F. above the temperature of said boiling body, supplying heat to said boiling body by condensation of said compressed water vapor in indirect heat exchange with said boiling body, continuously withdrawing ferrous sulfate insoluble therein and excess liquor from said boiling body of liquor, and separating the ferrous sulfate in the form of monohydrate from the excess liquor.

10. The method of claim 9, in which the temperature of the supply of spent pickle liquor is adjusted by heat exchange with the separated excess liquor.

11. Method for reducing the water content of a solution of sulfuric acid containing ferrous sulfate which comprises evaporating a body of said acid solution at its boiling point at subatmospheric pressure, separating water vapor from said acid solution, withdrawing said separated water vapor to achieve said subatmospheric pressure and compressing said separated water vapor to achieve a temperature difference between the compressed water vapor and the boiling acid solution sufficient to maintain said acid solution at a concentration between about 35% and about 45% $H_2SO_4$ by weight, and to evaporate said acid solution by supplying heat thereto by condensation of said compressed water vapor in indirect heat exchange with said body of acid solution.

References Cited in the file of this patent

UNITED STATES PATENTS 2,785,957     Ruthner _____ Mar. 19, 1957